(12) United States Patent
Stenacker

(10) Patent No.: US 8,150,666 B2
(45) Date of Patent: Apr. 3, 2012

(54) METHODS AND SYSTEMS FOR COMBINING MODELS OF GOODS AND SERVICES

(75) Inventor: Steven L. Stenacker, Sugar Land, TX (US)

(73) Assignee: Holomar, Inc., Houston, TX (US)

(*) Notice: Subject to any disclaimer, the term of this patent is extended or adjusted under 35 U.S.C. 154(b) by 859 days.

(21) Appl. No.: 11/908,593

(22) PCT Filed: Mar. 14, 2006

(86) PCT No.: PCT/US2006/008862
§ 371 (c)(1),
(2), (4) Date: Sep. 13, 2007

(87) PCT Pub. No.: WO2006/099271
PCT Pub. Date: Sep. 21, 2006

(65) Prior Publication Data
US 2008/0201113 A1 Aug. 21, 2008

Related U.S. Application Data

(60) Provisional application No. 60/661,617, filed on Mar. 14, 2005, provisional application No. 60/690,121, filed on Jun. 13, 2005.

(51) Int. Cl.
G06G 7/48 (2006.01)
G06F 17/50 (2006.01)
(52) U.S. Cl. .................................. 703/7; 703/1
(58) Field of Classification Search .......... 703/6, 7, 703/1
See application file for complete search history.

(56) References Cited

U.S. PATENT DOCUMENTS

| | | | |
|---|---|---|---|
| 5,752,239 A | 5/1998 | Coutts | |
| 6,633,289 B1 | 10/2003 | Lotens et al. | |
| 6,792,401 B1 | 9/2004 | Nigro et al. | |
| 6,901,380 B1* | 5/2005 | Bremers | 705/26.81 |
| 7,062,454 B1* | 6/2006 | Giannini et al. | 705/26.81 |
| 7,069,192 B1* | 6/2006 | Freitag | 703/1 |
| 7,353,188 B2* | 4/2008 | Yim et al. | 705/26.62 |
| 7,909,241 B2* | 3/2011 | Stone et al. | 235/376 |
| 2001/0026272 A1* | 10/2001 | Feld et al. | 345/419 |
| 2001/0047250 A1* | 11/2001 | Schuller et al. | 703/1 |
| 2002/0002511 A1* | 1/2002 | Yim et al. | 705/26 |
| 2002/0040327 A1 | 4/2002 | Owa | |
| 2002/0104019 A1* | 8/2002 | Chatani et al. | 713/201 |
| 2003/0101105 A1 | 5/2003 | Vock | |
| 2004/0158412 A1* | 8/2004 | Friedrich et al. | 702/31 |

(Continued)

OTHER PUBLICATIONS

William Stallings, Cryptography and Network Security: Principles and Practice, second edition, 1999, Prentice Hall, p. 166, figure 6.1.

*Primary Examiner* — David Silver
(74) *Attorney, Agent, or Firm* — Richard A. Fagin

(57) ABSTRACT

The present disclosure describes methods and systems for combining Models of goods and services. At least some embodiments include a method that includes retrieving a first Model representing an object, a User controlling access to the first Model; retrieving a second Model representing a product offered by a Product Provider; combining, at the request of the User, the first and second Models, wherein the combining is performed as a first service, by a Service Provider, and wherein the first service comprises computing a simulated physical interaction between the object and the product; generating a representation of the simulated physical interaction; and presenting the representation to the User.

10 Claims, 5 Drawing Sheets

U.S. PATENT DOCUMENTS

2005/0097061 A1* 5/2005 Shapiro et al. .................. 705/67
2005/0177463 A1 8/2005 Crutchfield, Jr. et al.
2006/0129360 A1 6/2006 Ballin et al.
2008/0100570 A1* 5/2008 Friedrich et al. .............. 345/156
2009/0319397 A1* 12/2009 Joe et al. ......................... 705/27

* cited by examiner

METHODS AND SYSTEMS FOR COMBINING MODELS OF GOODS AND SERVICES

CROSS-REFERENCE TO RELATED APPLICATIONS

This application is a national phase, non-provisional application claiming priority to International Application No. PCT/US2006/008862 filed on Mar. 14, 2006, and entitled "Methods and Systems for Combining Models of Goods and Services," which in turn claims priority to both U.S. Provisional Application Ser. No. 60/661,617 filed on Mar. 14, 2005, and entitled "Methods and Systems for Marketing Goods and Services," and U.S. Provisional Application Ser. No. 60/690,121 filed on Jun. 13, 2005, and entitled "Methods and Systems for Using Graphic Content to Express Communications in Commerce," all of which are hereby incorporated by reference.

STATEMENT REGARDING FEDERALLY SPONSORED RESEARCH OR DEVELOPMENT

Not applicable.

BACKGROUND

Though originally conceived as a means of exchanging research information, the Internet has grown into one of the world's major avenues for the sale of products and services. Indeed, the commercial exploitation of the Internet seems to have greatly eclipsed its original pedagogical function. A great deal of time and resources are spent today searching for new ways to utilize the Internet as a sales and marketing tool. As a result, the Internet has evolved into what some have described as a virtual shopping mall. Patrons can "walk" through the mall by surfing the Web, which allows them to see what products are available and at what price. If consumers wish to buy something, they can pay for their purchase online using either credit cards or other secure payment systems such as PayPal®. The purchased item may then be shipped to the consumers' homes, or picked up at a local retail outlet. But even though consumers can see pictures and read information related to the products being offered for sale on the Internet, they cannot physically interact with these products. Further, a great many alternatives for virtually evaluating and comparing online products and services, some of which may not necessarily be feasible in the real world, have yet to be explored.

SUMMARY

The present disclosure describes methods and systems for combining a first Model (representing an object, access of which is controlled by a user) and a second Model (representing a product offered by a product provider) to compute a simulated interaction between the object and the product. A representation of the simulated interaction is sent to the user. The capability of combining the Models is provided by a service provider as a service.

BRIEF DESCRIPTION OF THE DRAWINGS

For a detailed description of the embodiments of the invention, reference will now be made to the accompanying drawings in which.

NOTATION AND NOMENCLATURE

Certain terms are used throughout the following discussion and claims to refer to particular system components. This document does not intend to distinguish between components that differ in name but not function. In the following discussion and in the claims, the terms "including" and "comprising" are used in an open-ended fashion, and thus should be interpreted to mean "including but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. Additionally, the term "system" refers to a collection of two or more parts and may be used to refer to a computer system or a portion of a computer system.

The term "software" includes any executable code capable of running on a processor, regardless of the media used to store the software. Thus, for example, code stored in non-volatile memory, and sometimes referred to as "embedded firmware," is included within the definition of software. Further, the term server refers to a computer system that provides either local or remote access, or both, to one or more computer programs executing on the computer system. A server comprises one or more individual computers and/or computer peripheral components (e.g., processors and disk arrays) accessible by other computer systems (clients) through a communications network (e.g., the Internet). Additionally, the term "product" is intended to include both tangible and intangible goods, as well as services.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. The discussion of any embodiment is meant only to be illustrative of that embodiment, and not intended to intimate that the scope of the disclosure, including the claims, is limited to that embodiment.

The development of online shopping has brought with it the opportunity to explore new alternatives for offering goods and services to consumers. These alternatives are made possible, in part, by the ability to digitally encode, represent and manipulate objects (both physical and virtual). Once so encoded, these digital representations ("Models") may be combined so as to simulate how the objects would interact in the real world. Within the context of online shopping, such interactions allow consumers ("Users") to see how goods they already own (or may own in the near future) interact with other goods or services that they are considering acquiring from online providers ("Product Providers").

Figure 1A:
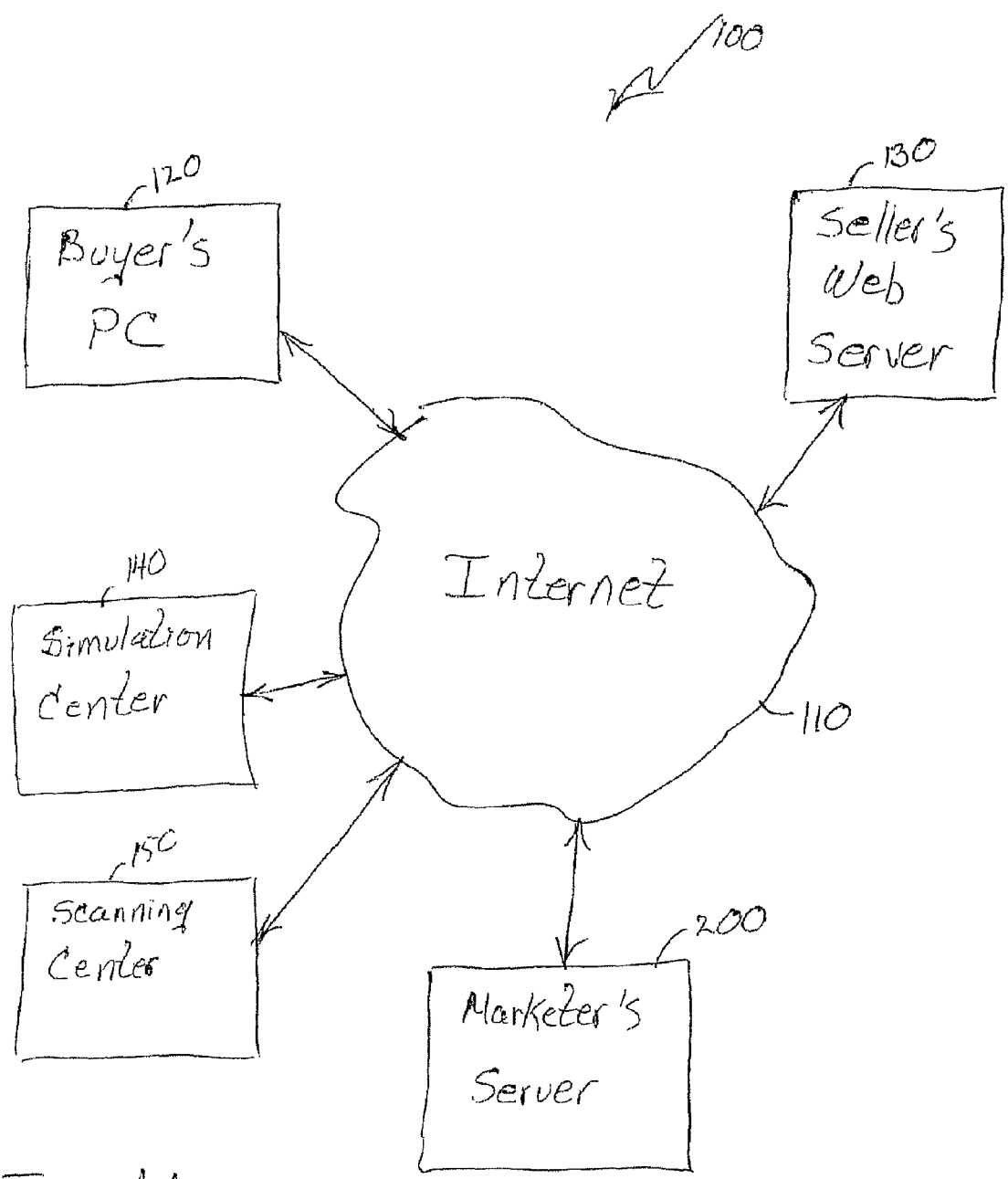
FIG. 1A illustrates a system for combining Models, in accordance with at least some embodiments.

FIG. 1A shows a system 100, in accordance with at least some illustrative embodiments, which allows a User to combine the User's Models with Models of goods or services offered by a Product Provider. The User utilizes a computing device, such as personal computer ("PC") 120, to access the Product Provider's website, hosted on the Product Provider's web server 130, across Internet 110. The User may also utilize one of a number of other types of computing devices, such as a cellular telephone, personal digital assistance ("PDA"), or a set top box. The present disclosure is not intended to be limited to any particular computing devices. The User may also combine Models, displaying and interacting with the results of the combination using the facilities provided at simulation center 140 (described below). The User may further generate a Model of the User's body by using the facilities provided at scanning center 150 (described below).

Once the User determines that the Product Provider maintains Models (representing the Product Provider's products) that are compatible with the User's Model, the User may select a link on the Product Provider's website that redirects the User to server 200, operated by an online service provider (Service Provider). In at least some embodiments, the User may alternatively access the Service Provider's online server directly without first accessing the Product Provider's website. The User may use a web-based user interface provided by server 200 to request that the Service Provider's server retrieve and combine the User's Model and the Model for the Product Provider's product. The result of combining the User's and Product Provider's Models is sent to the User's PC 120 and displayed as a graphical representation, allowing the User to see how the selected goods and/or services will interact.

Figure 1B:
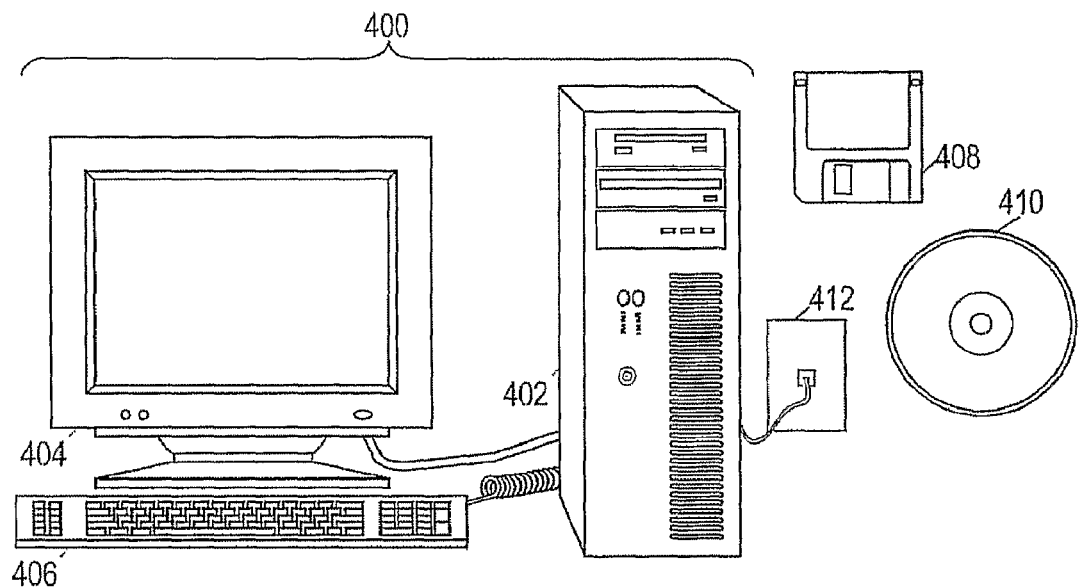
FIG. 1B illustrates an example of the personal computer (PC) of FIG. 1A, in accordance with at least some embodiments.
Figure 1C:
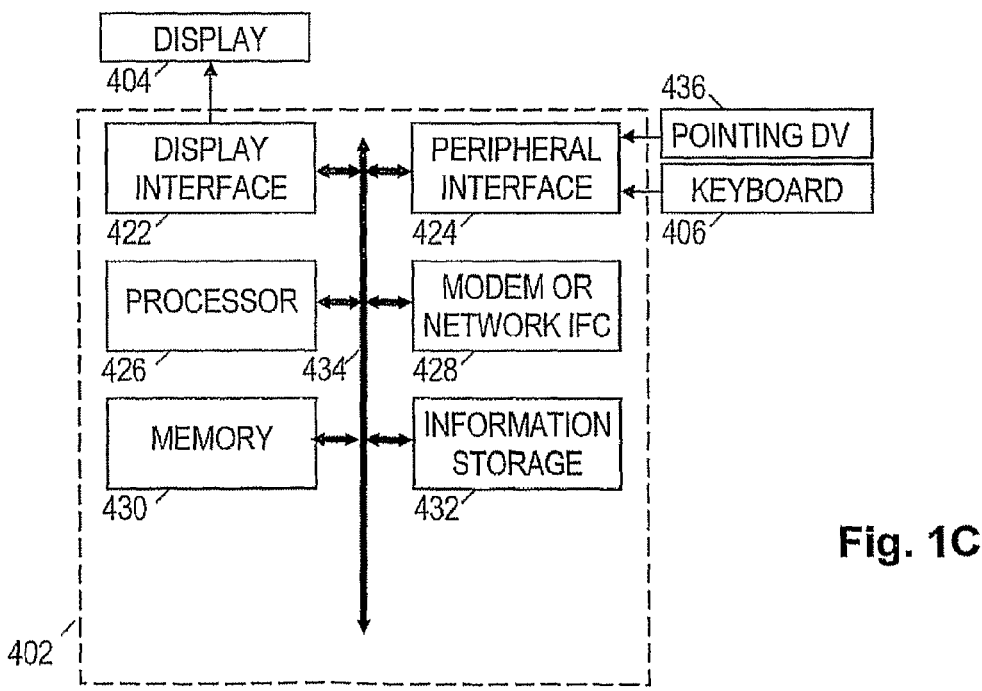
FIG. 1C illustrates a block diagram of the PC of FIGS. 1A and 1B, in accordance with at least some embodiments.

FIGS. 1B and 1C show an illustrative system configuration 400 suitable for implementing PC 120. As shown, the illustrative system configuration 400 includes a chassis 402, a display 404, and an input device 406. The chassis 402 includes a processor 426, memory 430, and information storage devices 432. One or more of the information storage devices 432 may store programs and data on removable storage media such as a floppy disk 408 or an optical disc 410. The chassis 402 also includes a network interface 428 that allows the system 400 to receive information via a local area network (e.g., Internet 110 of FIG. 1A) and/or a wired or wireless wide area network, represented in FIG. 1B by a phone jack 412. The information storage media and information transport media (i.e., the networks) are collectively called "information carrier media." The chassis 402 is coupled to the display 404 and the input device 406 to interact with a User. The display 404 and the input device 406 may together operate as a user interface. The input device 406 is shown as a keyboard, but other input devices such as a mouse or a keypad may also be included.

FIG. 1C shows a simplified functional block diagram of system 400. The chassis 402 may include a display interface 422, a peripheral interface 424, a processor 426, a modem or other suitable network interface 428, a memory 430, an information storage device 432, and a bus 434. System 400 may be a bus-based computer, with the bus 434 interconnecting the other elements and carrying communications between them. The display interface 422 may take the form of a video card or other suitable display interface that accepts information from the bus 434 and transforms it into a form suitable for the display 404. Conversely, the peripheral interface 424 may accept signals from the keyboard 406 and other input devices such as a pointing device 436, and transform them into a form suitable for communication on the bus 434.

The processor 426 gathers information from other system elements, including input data from the peripheral interface 424, and program instructions and other data from the memory 430, the information storage device 432, or from other systems coupled to a local area network or a wide area network via the network interface 428. The processor 426 carries out the program instructions and processes the data accordingly. The program instructions may further configure the processor 426 to send data to other system elements, comprising information for the User which may be communicated via the display interface 422 and the display 404. The network interface 428 enables the processor 426 to communicate with other systems via a local area network or via a wide area network. The memory 430 may serve as a low-latency temporary store of information for the processor 426, and the information storage device 432 may serve as a long term (but higher latency) store of information.

The processor 426, and hence the computer 400 as a whole, operates in accordance with one or more programs stored on the information storage device 432 or received via the network interface 428. The processor 426 may copy portions of the programs into the memory 430 for faster access, and may switch between programs or carry out additional programs in response to User actuation of the input device. The additional programs may be retrieved from the storage device 432 or may be retrieved or received from other locations via the network interface 428. One or more of these programs executes on system 400 causing it to perform at least some of the graphical display functions disclosed herein.

Figure 2:
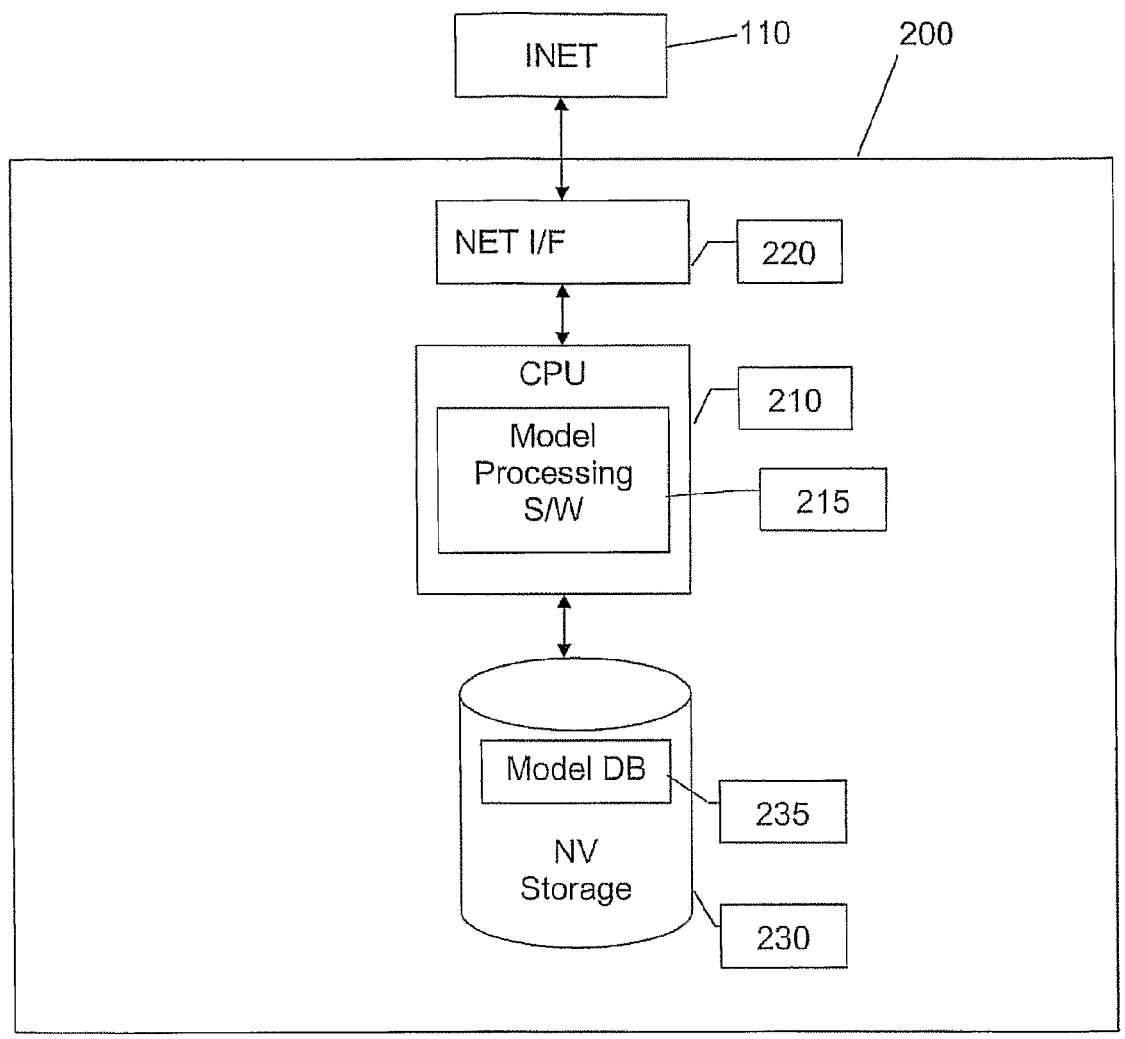
FIG. 2 illustrates the Service Provider's server of FIG. 1A, in accordance with at least some embodiments.

FIG. 2 shows a detailed view of the Service Provider's server 200, in accordance with at least some embodiments. Service Provider's server 200 includes CPU 210, which executes Model processing software 215. CPU 210 couples to non-volatile storage 230, which stores Model database 235. In the embodiment shown, Model database 235 includes both the User's and the Product Provider's Models, but each may be stored on separate databases and on separate non-volatile storage units, either on Service Provider's server 200 or on other servers accessible by Service Provider's server 200 via a network (e.g., the Internet 110). Many other storage configurations will become apparent to those skilled in the art, and all such combinations are intended to be within the scope of the present disclosure.

CPU 210 also couples to network interface 220, which provides connectivity to the Internet 110. Although the embodiment of FIG. 2 shows the Service Provider's server 200 coupled to the Internet, other communications networks may be used (either wired or wireless), and all such communications networks are intended to be within the scope of the present disclosure. Model processing software 215 receives requests to access Models stored on Model database 235 and selected by the User. The User also provides the authentication information needed to authorize access to the User's Model.

Once the Models are selected and retrieved from Model database 235, the Models are combined as requested by the User and in accordance with a set of rules controlling the interaction of the Models. These rules may be included as part of the Models, may be stored and supplied separately, or may be generated as needed by Model processing software 215 based upon information stored within each of the Models. The rules allow the respective owners of each Model (User and Product Provider) to optionally control the amount of information, contained within a Model, which is accessible when it is combined with another Model. The rules also allow the owners of the Models to define how a Model interacts with other Models. The result of the interaction of the Models is generated by Model processing software 215 and graphically presented to the User at the User's PC 120 (FIG. 1A). This graphical representation may be either static or dynamic, depending upon the capabilities of the Models so combined, and upon the parameters included in the request submitted by the User.

Figure 3:
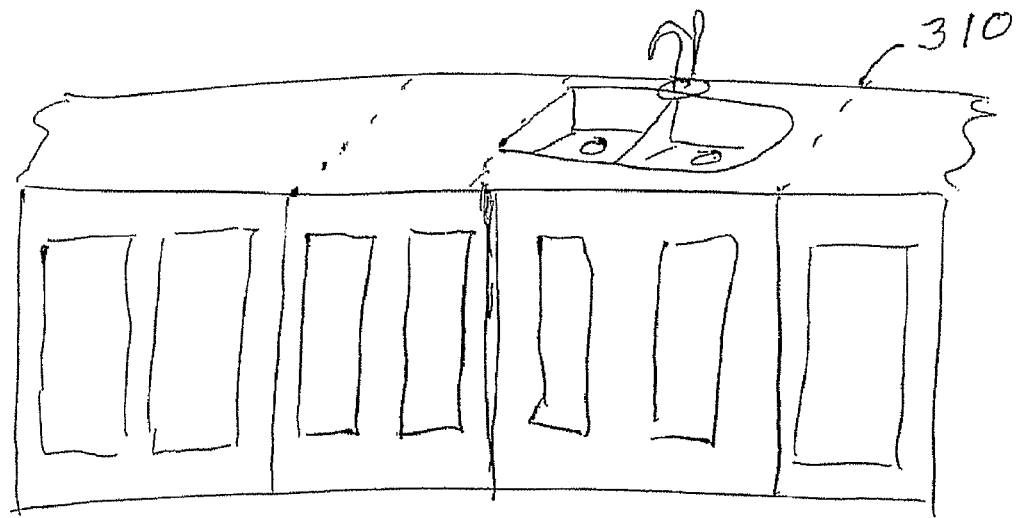
FIG. 3 illustrates an example of combining Models, in accordance with at least some embodiments.
Figure 3:
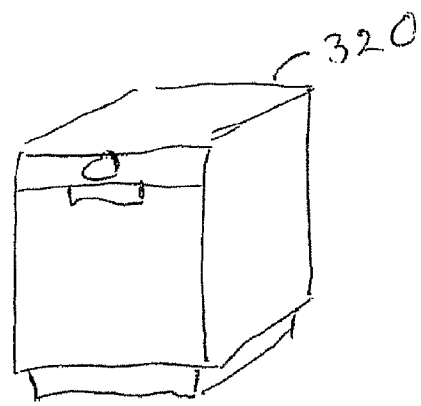
Figure 3:
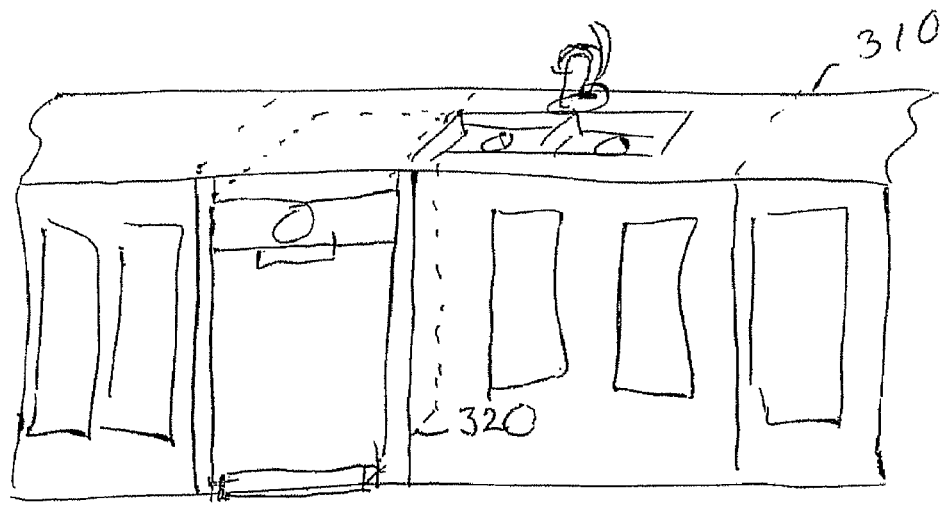

FIG. 3 shows an example of how a User might use such a system to purchase a dishwasher. The User first obtains a digital Model of the User's house, including a portion of a kitchen cabinet 310 where the dishwasher is to be installed. This Model may be based, for example, on computer aided design ("CAD") files created by either the original architect of the house or by the builder, which are then converted by the Service Provider to a custom common format as a service to the User at little or no cost. Such a conversion serves to create Models that are in a common format and thus compatible with each other. The conversion also serves to reduce the amount of information stored within the Model. Alternatively, the Service Provider or another third party (e.g., a real estate agent as part of the agent's listing service) may provide the User with a service wherein the User's home is digitized by personnel that visit the User's home and collect the required data. The resulting User's Model is stored on the Service Provider's server, where the User may access it by providing the required authentication information (e.g., a user ID and password), or provide access to other third parties (e.g., the real estate agent described above). Likewise, the Service Provider creates and stores Models of the Product Provider's goods, which may be created in the same manner as the User's Models. In the present example, a Model for the selected dishwasher 320 is stored on the Service Provider's server. Each of these Models includes, among other things, the physical dimensions of the items represented.

After the User selects the desired dishwasher on the Product Provider's website, the User is redirected to the Service Provider's server. In at least some embodiments, the User may alternatively access the Service Provider's server directly, without first visiting the Product Provider's website and can select the desired product Model from a list supplied by the Service Provider. The list includes products from Product Providers that have arranged to have their products listed by the Service Provider. Additional information regarding the Product Provider (e.g., retail locations and website URL) may also be provided. The Service Provider may charge a fee for including a Product Provider's products in such a list. The User identifies the location within the kitchen cabinet 310 where the dishwasher should be installed, and provides the necessary authentication information to access the Model of the User's home. In other embodiments, intelligent Models will automatically select the location for the dishwasher (based upon constraints present within the kitchen and coded within the Model, such as the available space and the location of the plumbing and electrical service). The Model processing software then combines the dishwasher 320 with the kitchen cabinet 310. In the example of FIG. 3, the dishwasher 320 is displayed installed within the kitchen cabinet 310, allowing the User to see how it would actually look in the User's kitchen, and allowing the User to confirm that it would in fact fit in the space where the User wishes to install it. In some embodiments, the Model of the User's home may reflect the actual appearance of the kitchen, including color schemes and other decorative accents, allowing the User to determine if the color and style of the dishwasher will match that of the User's kitchen. If the User manually places dishwasher 320 within kitchen cabinet 310, collision detection techniques may be used by the Model processing software to identify the overlap between dishwasher 320 and kitchen cabinet 310, if such overlap exists, and display it to the User.

Figure 4:
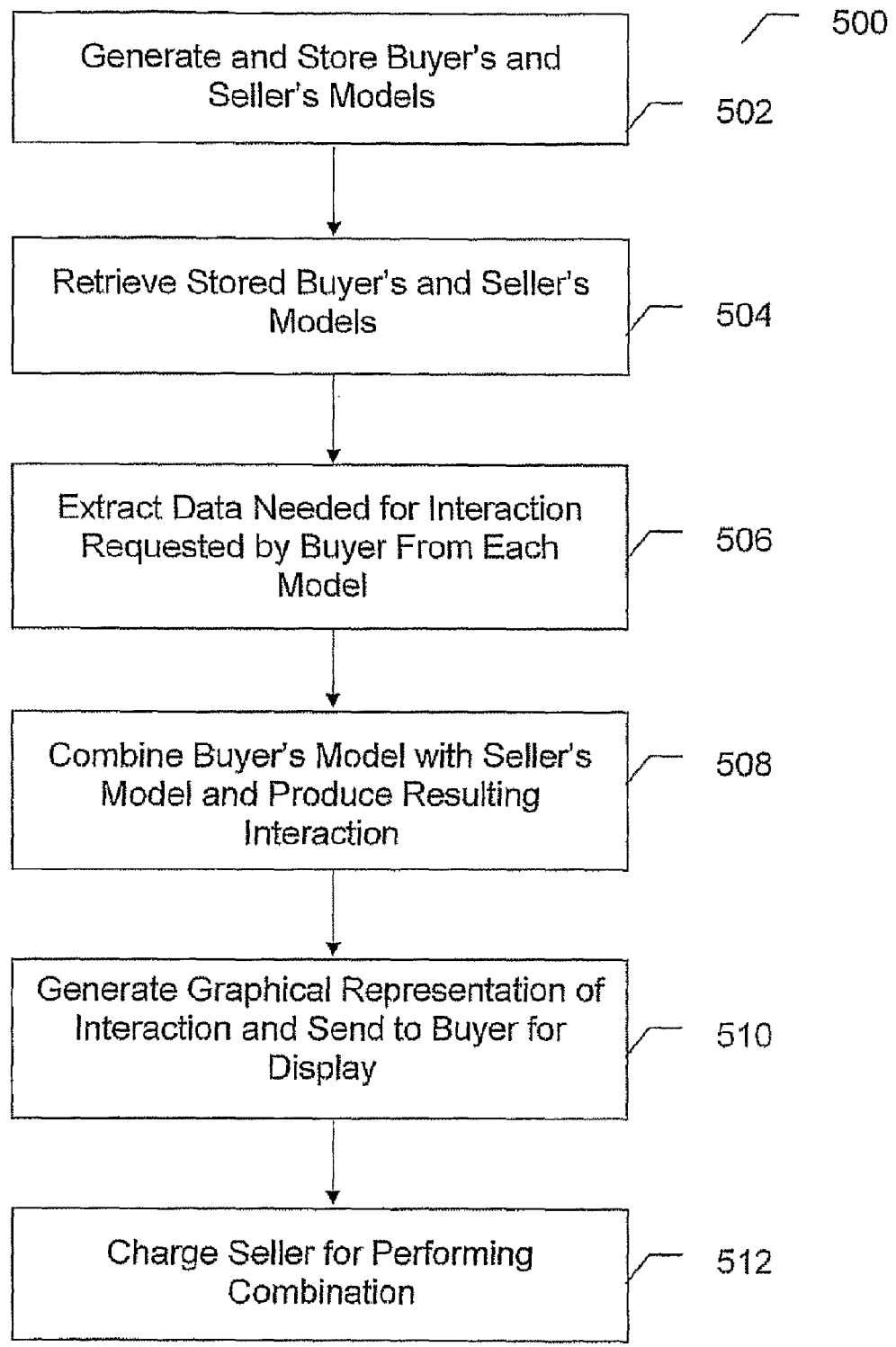
FIG. 4 illustrates a method for providing a service for combining Models, in accordance with at least some embodiments.

In the embodiments described, the User and the Product Provider both make use of the software and associated server hardware provided by the Service Provider. The ability to manipulate and combine stored Models is provided by the Service Provider as a set of services to Users and Product Providers. Such services may also include the creation of the Models for use by the Model processing software 215 of FIG. 2, as well as the provision of statistics to Product Providers for usage of Product Providers' Models. FIG. 4 shows a method 500, in accordance with at least some embodiments, for providing such a service. After generating and storing both the User's and the Product Provider's Models (block 502), the Models are retrieved (block 504) in response to a request by a User to combine the User's Model with the Product Provider's Model.

Data necessary to combine the User's and Product Provider's Models is extracted from each Model (block 506), and combined to produce the resulting interaction between the Models (block 508). Such data extraction may be required by either the Model processing software or by a Model (based upon limitations encoded within the Model). A graphical representation of the resulting interaction between the Models is generated and transmitted to the User for display (block 510). Once completed, the Service Provider charges the Product Provider for performing the transaction. Many fee structures may be used to charge for the services offered by the Service Provider. Some examples include:

Fees paid by the Product Provider for each combination performed by a User

Fees paid by the Product Provider for storage and availability to Users of Models Fees paid by the Product Provider for each retrieval of a Model stored on a server operated by the Product Provider Fees paid by the Product Provider based upon processor time consumed to generate and display a combination Fees paid by in the form of a licensing royalty for use of the software by third parties operating as a Model Provider (to create Models)

Fees paid by the Product Provider to create Models

Fees paid by operators of simulation centers (described below)

Optionally, the Service Provider may also collect statistics relating to which of the Product Provider's Models are being accessed by various groups of Users (based on any of a variety of demographics), and subsequently provide the information to the Product Provider as a service for a fee. In some embodiments, such statistics are collected without disclosing the identity of the Users or compromising the User's privacy. For example, statistics gathered regarding Models utilized by Users may be correlated to Users' zip codes, thus providing valuable demographic data while maintaining the anonymity of individual Users. Alternatively, more specific data may be disclosed to Product Providers, also for a fee, if Users consent to the disclosure of such personalized demographic information.

As already noted, each Model can include a significant amount of information. Many transactions only require a small subset of the information stored within a Model in order to determine how the Model will interact with another Model. In the dishwasher example previously described, only a small portion of the information from the User's house Model was required to determine how the Product Provider's dishwasher would interact with the User's kitchen cabinet. Thus, the Model processing software also performs a data filtering and reduction function. By performing this function, the amount of data used to represent and display the resulting Model interaction is reduced. This data reduction results in a corresponding reduction in the bandwidth needed to transmit interaction data (used to present the results) to the User's PC, and in a similar reduction of the PC performance requirements imposed upon the User.

In the embodiments described, the Models are stored on one or more databases and non-volatile storage devices (e.g., hard disk arrays). By keeping the Models stored on a device and/or database within the control of the Service Provider, the Service Provider can control and monitor access to the Models, and charge a fee for access. Alternatively, the Models may also be stored on devices and/or databases that belong to either the User or the Product Provider. In such embodiments, access to the Model may be controlled and monitored by encrypting the Models so stored, and requiring the User and/or Product Provider to upload the Model to the Service Provider's server whenever the Model is needed. The Service Provider's server may hold the keys required to decrypt and access the data stored within the Model.

Models stored in this manner may, for example, allow Users to store Models on portable storage media, such as a memory stick. The User may then take the stored Models to a retail outlet, where the User may plug the memory stick into a computer at the retail outlet with connectivity to the Service Provider's server. The User may then assess products in the same manner as already described, and purchase products in person at the retail outlet. Because of the additional risk of exposure of personal information stored within the Model, a special mode of operation may be defined where at least some of the information stored in the Model is not decrypted and exposed when the Model is stored on a portable storage device as described above.

It should be noted that regardless of where the Models are physically stored, access to the User Models is controlled by the User, and by the operator of the Service Provider's server. In at least some embodiments, the User controls access to the User's Models through authentication codes, entered manually by a User interacting with the Service Provider's server (e.g., via a website on the Internet). The operator of the Service Provider's server controls access to the Models by requiring Users to access Models through the Service Providers server and to combine them using software that runs on the Service Provider's server (e.g., Model processing software 215 of FIG. 2). The access and use control exercised by the operator of the Service Provider's server allows the operator to provide such access and use as a service to Users and Product Providers, with the option to charge either, or both, for the service. In at least some of the embodiments described, Product Providers do not restrict access to Product Models in the manner described for Users, since the Product Provider's objective is to make them as widely available to the public as possible.

As previously noted, the results of the combination of the Models performed by the Model processing software 235 of FIG. 2 may be provided graphically to the User. This graphic representation may be in the form of either a two-dimensional or a three-dimensional image, and may be either static or dynamic. For example, in at least some embodiments the dishwasher 320 of FIG. 3 is shown installed in the kitchen cabinet 310 using a static image. If the User also wants to know how far out the door of the dishwasher extends when opened, a dynamic representation may be generated by the Model processing software 235, wherein a short animated graphical sequence is generated and provided to the User for display that shows the dishwasher installed in the User's kitchen and in which the door is opened and closed. In some embodiments, the display of, and User interaction with, the interacting Models may be accomplished using video encoding and graphics engine technology similar to that utilized in media players and video games. Multiple dynamic Models, including a Model of the User, can be combined to assess the large number of combinations of actions possible that can cause the Models to interact in undesired ways (e.g., a new cabinet that, when installed, collides with a ceiling fan when the cabinet door is opened).

Dynamic Models may also be used demonstrate how to use a product properly. For example, a User may combine a Model of the User with a Model of a dishwasher and request a demonstration of how to properly load and unload the dishwasher. The User may also include Models of pots and pans owned by the User in order to see the best way for that particular User to load and unload the dishwasher. Other possible uses for such demonstrative combinations include the installation, maintenance, and/or repair of products. The User could also include Models of the tools owned by the User, allowing the combining software to determine how to perform the activity selected based upon the tools available, and possibly to suggest the purchase of tools needed but not owned by the User. In at least some embodiments, such demonstration capabilities may be invoked manually be the User, or automatically by the Product Provider's Model. By invoking the demonstration automatically, the Product Provider can make sure that a User is made aware of all of the features of the product. This automatic demonstration capability may thus function as a form of advertisement, and the Service Provider may charge the Product Provider a corresponding fee to enable this feature, if encoded within the Product Model.

Other similar Model combinations may be demonstrated automatically as well. For example, if a User has several Models on file with the Service Provider (such as Models for the User's car, home and self) and the Product Provider has Models of the Product Provider's store fronts on file, the Model combining software may accept information from the User that permits the Model combining software to identify the closest store front to the User's home, and to show the User entering the store and walking to the location within the store where the desired product is located. The Model combining software may further determine whether the product will fit in the User's car and may further determine the best way to bring it into the User's home, all by combining the selected product Model with the appropriate User Models. These combinations may be done upon request by the User, automatically upon selecting the Product Provider's Model, or through a combination of User selections and automatic demonstration. Other applications for such automatic demonstrations are possible, and all such applications are intended to be within the scope of the present disclosure.

The availability of dynamic graphical sequences further provides the opportunity to use the embodiments described to combine the User's Models with service Models representing services offered by a Product Provider. For example, if a User provides a Product Provider offering home remodeling services with access to the Model of the User's home, the Product Provider may then create a Model representing the specific remodeling project requested by the User. The resulting remodeling project Model is then combined with the User's home Model, and the resulting dynamic graphical sequence, provided to the User, shows all the steps necessary to implement the desired project, including such things as the extent of the required demolition, potential damage to other parts of the property, scaffolding requirements, the number of workers that will be on the job site, etc. The graphical sequence may be displayed to the User as a short, animated, time-lapse sequence that illustrates the entire project from start to finish.

The ability to provide a Product Provider with access to a User's Model also enables the Product Provider to provide the User with customized product renderings that illustrate special customizations not displayed by the product Model provided by the Product Provider to the general public. Thus, for example, a Product Provider of a home theater system, after being provided with access to the User's Model of the room of the User's house to be used as a home theater, can combine the User's room Model with a customized home theater system Model that takes into account special customized features, such as decorative panels and finished surfaces that match the décor of the room.

The Models that can be created for use by the system 100 of FIG. 1A or the method 500 of FIG. 4 are not limited to representing inanimate objects (goods) or sequences of events (services). Models may also be a representation of the User's physical body. Such Models allow a User to assess their interaction with a Product Provider's product. For example, if a User is shopping for a car, the User may combine a Model of the User's physical body with a Model of the car to see how the User fits and looks in the car. The Model processing software may produce either a 2D or a 3D image that can be reviewed by the User. In at least some embodiments, the Model of the User's body may optionally be an actual representation that includes skin and hair color as well as an image of the User's face. Thus, the User can see a much more realistic representation of how the User would look while driving the car. Again, automatic demonstrations of the product are possible, as previously described.

Dynamic graphical representations are useful in other contexts. For example, if the User is looking for a bicycle, the User may combine the User's personal Model with the Model of the bicycle and see not only how the User sits on the bicycle, but also to see the range of motion of the User's legs while peddling. Such Models may be created using motion capture technology to add the necessary information to determine range of motion limitations of both the bicycle and the User, which are encoded in the Models.

In order to facilitate the creation of a Model of a person, scanning centers may be provided, in at least some embodiments, with access to the necessary software to create Models and store them on the Service Provider's server. Such scanning centers, such as scanning center 150 of FIG. 1A, may be set up at any number of convenient locations. For example, a scanning center may be set up at a health club where Models of Users' bodies can be generated and combined with a projected workout plan (stored as a service Model) to illustrate the projected effect on the User's body. The resulting Model of the User's body may then be made available on the Service Provider's server for other uses by the User such as those described in the above examples.

The Model of a User's body may be created any number of techniques, including laser scanning and manual measurement and coding. Alternatively, where accurate Models are not necessary, the User may optionally create alternative Models with characteristics other than the actual characteristics of the User's body, using techniques similar to those used to create character representations in animated 3D role playing video games. The User may also create a generic Model that does not have any particular distinguishing characteristics, but simply represents an average, non-descript person, or even just a 3D outline of a person. In at least some embodiments, a single Model may be created that permits alternate views to be enabled by the User. The User may also configure the Model to automatically select a specific view or facade when the Model is combined with other specific Models. Thus, for example, a fantasy gaming facade may be selected automatically when the User is interacting with a role-playing gaming Model, but a facade that reflects the User's true physical appearance is selected when the User combines the Model of the User's body with all other non-gaming Models. Other alternative techniques for maintaining multiple Models or multiple views and facades within a single Model will become apparent to those skilled in the art, and all such techniques are intended to be within the scope of the present disclosure.

In other alternative embodiments, the User's may also combine Models and view the results of such combinations using the capabilities of a simulation center 140, as shown in FIG. 1A. In such a center, advanced imaging systems may be used that include stereoscopic viewing systems, holographic imaging systems, video projection systems, or even virtual immersion systems (e.g., systems using 3D goggles and full motion capture suits and gloves). Thus, using the home remodeling example, the User may watch the remodeling project unfold while immersed in the graphical sequence displayed by a projection system that displays images all around the User. The User may pause the sequence and walk through the displayed representation to see all of the potential problems that such a project might create. Tactile feedback systems may also be incorporated, allowing a User to interact with the virtual end results of the combination of the Models. Further, although these types of systems are well suited for use in the simulation center as described, some of these systems, such as for example the virtual immersion system, may be made available to Users by Product Providers at other locations (e.g., a retail outlet). Other types of display and access systems used at a variety of locations will become apparent to those skilled in the art, and all such systems and locations are intended to be within the scope of the present disclosure.

The Model processing software thus can produce more than just dynamic images viewed by the User, instead creating instead a new, modified Model that the User can interact with. Such a Model, like any other Model, may in turn be saved and combined with other Models. Additionally, multiple Models provided by multiple Product Providers may be provided and concurrently combined to show how the products represented by the Models may be combined together. Thus, several vendors of kitchen appliances may each provide Models of their products to be combined into a single remodeling project for a User's kitchen, which can then be displayed as a single interactive Model presented to the User at the simulation center 140.

The ability to combine multiple Models may also be used by multiple Users. For example, a Model of an area for a garage sale may be created, and multiple Users may combine Models of items each User wishes to sell at the garage sale with the garage sale area Model. The resulting garage sale Model may then be viewed by other Users that are shopping at the garage sale. The Users shopping at the garage sale in turn may interact with individual items offered for sale in the same manner as described above with regard to Users interacting with products offered for sale by Product Providers.

The embodiments of system 100 and method 500 may be applied in a number of different industries, each providing opportunities for unique applications of said system and method. For example, as already noted, a User can use a Model of the User's home to assess products that the User is contemplating buying and installing, or to see how a remodeling job might be implemented. A User could also see a preview of a "do-it-yourself" task and determine if the task is within the User's skill level. A User's Model can also be provided before a remodeling job to allow contractors to more accurately bid on the job without having to actually visit the home. Architects and contractors could also later use the User's home Model to assess change orders after a job has already begun. Product Providers can also use Models of properties to allow prospective Users to virtually tour the property, to plan the layout of their belongings (represented by Models), and to plan the actual move into the property. Property Models could also be used by emergency management personnel to assist with emergency and evacuation planning. In at least some embodiments, software may be provided that generates a stand-alone executable version of a Model with limited capabilities that does not require the Model combining software. Such a reduced-function Model could be used by emergency services personnel without requiring access the Service Provider's server. Thus, for example, an ambulance service could execute such a stand-alone Model of a residential property to find a particular apartment where a patient needs help without having to waste time trying to find where the apartment is located on the property.

The transportation industry also provides additional opportunities for the use of the systems and methods of the disclosed embodiments. Models of products and/or packages containing products to be shipped can be combined with Models of trailers, trucks, ships, and other containers and/or vehicles to support pre-load planning of such vehicles and containers. Models of loaded vehicles and containers can also be used as virtual manifests, allowing inspectors to locate specific products within a container by accessing a Model of the loaded vehicle or container. User's Models of objects that are to be shipped may also be combined with Models provided by shipping container vendors and shipping service providers to determine the best way to package and/or ship the object represented by the User's Models.

The healthcare industry may also have a variety of uses for the systems and methods of the disclosed embodiments. Operators of healthcare facilities may combine Models of supplies with Models of the storage areas within the healthcare facilities to optimize utilization of such storage areas, and to help locate critical supplies when needed by reference to a stored version of the facility Model that reflects current inventories of supplies. Medical product suppliers may also provide usage Models that can be combined with patient Models to illustrate how a medical product is used on a specific patient. This allows the medical professional to account for unique characteristics of a patient, such as a deformity or prosthetic that may affect how the product can be used.

The travel and lifestyle market may also take advantage of the capabilities of the embodiments described. Airline operators can provide Models of the aircraft to be used on a flight to allow Users to assess the seating and luggage accommodations. Users can use a personal Model of the User to "test" the seats. Similarly, a User can use a Model of the User's carry-on luggage to see if it will fit in the overhead compartment of the aircraft. Airlines and airport operators can also provide up-to-date Models of the terminal facilities that reflect activities that can affect a traveler's transit through the terminal (e.g., terminal remodeling that could affect how much time a traveler needs to reach the gate of a connecting flight). Terminal Models also allow a traveler to visually determine the location of meeting places, car rental counters, restroom, and other facilities in advance, making it easier to locate later. Travel agents may provide similar Models for products, services, and destinations as part of the travel package being offered.

The embodiments described also have applications in the entertainment industries. Models representing concert performances by an artist can be combined with a Model of a User's home, allowing the performance to be displayed to the User as if taking place at the User's home. Using technology similar to that used in the simulation centers described above, the User can be fully immersed in a performance that appears as if it is taking place in the User's own home.

The above disclosure is meant to be illustrative of the principles and various embodiments of the present invention. Numerous variations and modifications will become apparent to those skilled in the art once the above disclosure is fully appreciated. For example, although many of the embodiments are described in terms of combining Models controlled by Users and Product Providers that are buying and selling goods and services, other Users and Product Providers that are neither buying nor selling goods and services may also use the systems and methods described, such as, for example, emergency services personnel as previously described. Also, although the resulting interaction of Models in the embodiments described is displayed graphically, textual displays describing all or part of the interaction are also possible, instead of or in combination with the graphical display of the interaction. Such textual representations may include hyperlinks that allow a user to proceed to alternative displays of the interaction that provided additional levels of graphical detail. Graphical and textual displays of information may also be supplemented with audio information. It is intended that the following claims be interpreted to embrace all such variations and modifications.

What is claimed is:

1. A method, comprising:
   retrieving at a user location, a predetermined model representing at least dimensions of at least one room of an existing building plan, the predetermined model stored in a service provider operated database;
   a user making at least one change to a parameter of the predetermined model at the user location, resulting in a user model;
   processing the user model in a processor operated by the service provider, the processing comprising retrieving at least one of a product specification, a work specification and a material specification, the at least one of a product specification retrieved from at least one of the service provider operated database and a product provider operated database;
   generating a representation of the user model after processing using the at least one of the product specification, the work specification and the material specification;
   presenting the representation to the user at the user location, the representation including at least one of the material specification, the work specification and the product specification to produce a physical embodiment of the representation; and
   storing the user model on a non-volatile storage device under control of the user, wherein the user model data is encrypted, and
      wherein a key to decrypt the user model data is under control of the service provider.

2. The method of claim 1 wherein an operator of the product provider database pays the service provider for access to the processor by the product provider database.

3. The method of claim 1 wherein the representation further comprises a cost to produce the physical embodiment of the representation.

4. The method of claim 1, wherein at least one of retrieving the predetermined model, producing the user model, accessing the database operated by the product provider and presenting the representation comprises transmitting data across a communications network.

5. The method of claim 1, wherein the at least one parameter comprises dimensions of an installable product.

6. A processor readable medium having stored thereon logic operable to cause a programmable processor to perform the following:

retrieving from a user location, a predetermined model representing at least dimensions of at least one room of an existing building plan, the predetermined model stored in a service provider operated database;

a user making at least one change to a parameter of the predetermined model at the user location, resulting in a user model;

processing the user model in a processor operated by the service provider, the processing comprising retrieving at least one of a product specification, a work specification and a material specification, the at least one of a product specification retrieved from at least one of the service provider operated database and a product provider operated database;

generating a representation of the user model after processing using the at least one of the product specification, the work specification and the material specification;

presenting the representation to the user at the user location, the representation including at least one of the material specification, the work specification and the product specification to produce a physical embodiment of the representation; and storing the user model on a non-volatile storage device under control of the user, wherein the user model data is encrypted, and wherein a key to decrypt the user model data is under control of the service provider.

7. The processor readable medium of claim 6 wherein an operator of the product provider database pays the service provider for access to the processor by the product provider database.

8. The processor readable medium of claim 6 wherein the representation includes a cost to produce the physical embodiment of the representation.

9. The processor readable medium of claim 6, wherein the logic steps are operable such that presenting the representation comprises transmitting data across a communications network.

10. The processor readable medium of claim 6, wherein the at least one parameter comprises dimensions of an installable product.

* * * * *